(12) United States Patent
Lee et al.

(10) Patent No.: US 11,882,332 B2
(45) Date of Patent: Jan. 23, 2024

(54) DISPLAY DEVICE AND SERVER FOR COMMUNICATING WITH DISPLAY DEVICE

(71) Applicant: SAMSUNG ELECTRONICS CO., LTD., Suwon-si (KR)

(72) Inventors: Kihak Lee, Suwon-si (KR); Daehyun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 19 days.

(21) Appl. No.: 17/281,876

(22) PCT Filed: Oct. 2, 2019

(86) PCT No.: PCT/KR2019/012964
§ 371 (c)(1),
(2) Date: Mar. 31, 2021

(87) PCT Pub. No.: WO2020/071816
PCT Pub. Date: Apr. 9, 2020

(65) Prior Publication Data
US 2021/0400340 A1      Dec. 23, 2021

(30) Foreign Application Priority Data
Oct. 2, 2018   (KR) ........................ 10-2018-0117880

(51) Int. Cl.
*H04N 21/442* (2011.01)
*G06Q 30/0234* (2023.01)
*H04N 21/4784* (2011.01)

(52) U.S. Cl.
CPC ... *H04N 21/44204* (2013.01); *G06Q 30/0234* (2013.01); *H04N 21/4784* (2013.01)

(58) Field of Classification Search
CPC ......... H04N 21/44204; H04N 21/4784; H04N 21/2543; H04N 21/44209; H04N 21/6582; G06Q 30/0234; G06Q 30/02
See application file for complete search history.

(56) References Cited

U.S. PATENT DOCUMENTS 9,727,873 B1 *    8/2017   Wood ..................... G06Q 30/02
2007/0271590 A1 * 11/2007  Gulas ................... H04L 65/4069
                                                           725/118

(Continued)

FOREIGN PATENT DOCUMENTS

JP    2000-270309 A    9/2000
JP    2004-343238 A   12/2004

(Continued)

OTHER PUBLICATIONS

International Search Report (PCT/ISA/210) dated Jan. 14, 2020 by the International Searching Authority in International Application No. PCT/KR2019/012964.

(Continued)

*Primary Examiner* — Adil Ocak
(74) *Attorney, Agent, or Firm* — Sughrue Mion, PLLC

(57) ABSTRACT

A display device according to an embodiment in the present disclosure comprises: a display; a communication unit to perform communication; a memory storing one or more instructions; and a control unit including at least one processor to perform at least one of the one or more instructions. The display device according to an embodiment in the present disclosure can increase the convenience and efficiency of refund processing by automatically providing a refund request method based on reproduction quality information of a content item.

11 Claims, 11 Drawing Sheets

(56) References Cited

U.S. PATENT DOCUMENTS

2016/0366425 A1* 12/2016 Nagamine ............ H04L 12/184
2016/0373194 A1   12/2016 Long et al.

FOREIGN PATENT DOCUMENTS

| KR | 10-2017-0022057 A | 3/2017 |
| KR | 10-2017-0045829 A | 4/2017 |
| KR | 10-1816740 B1 | 1/2018 |
| KR | 10-2018-0079562 A | 7/2018 |

OTHER PUBLICATIONS

Communication dated Mar. 2, 2023 by the Korean Intellectual Property Office in Korean Patent Application No. 10-2018-0117880.

* cited by examiner

DISPLAY DEVICE AND SERVER FOR COMMUNICATING WITH DISPLAY DEVICE

TECHNICAL FIELD

The present disclosure relates to a display device for receiving content, from a server, and reproducing the content, and a server communicating with the display device.

BACKGROUND ART

With the distribution of displays and the development of technologies, display devices having various forms and functions have been developed.

Accordingly, functions meeting various needs or intentions of consumers may be implemented using a display device.

The display device may be connected to various wired or wireless communication networks and receive at least one of a plurality of content items through the connected communication network. Recently, the types and number of content items that may be displayed through the display device have become very diverse.

For example, as content items, even with the same content, having various reproduction qualities, such as whether an advertisement is included, resolution information, or a bit rate, are provided, a user may select and receive content corresponding to a desired reproduction quality.

In addition, content may be provided via a paid service by a content provider such as a server. In the paid service, a user who wants to view content needs to make a predefined payment corresponding to the content. Hereinafter, for convenience of explanation, the payment which is to be made by a user to view a content item will be referred to as a 'content viewing price'. In addition, an entity that produces and/or provides content will be referred to as a 'server'. In a case where content items have the same content but different reproduction qualities, their content viewing prices may be different from each other. Accordingly, the server for providing content items should allow a user to view a content item having a reproduction quality corresponding to its content viewing price. Furthermore, if a content item is being provided with a reproduction quality that is relatively low considering its content viewing price, or with an error in its reproduction quality, it is necessary to allow the user to receive a refund of at least part of the content viewing price.

In addition, in order to provide a content item corresponding to a reproduction quality that a user desires, the server needs to collect reproduction quality information of the content items to be reproduced in the display device. Furthermore, the server may manage the content item to be reproduced with a reproduction quality equal to or greater than a certain reference, based on the collected reproduction quality information. In a conventional method for collecting reproduction quality information of content, error information generated when an error has occurred in reproducing content by a display device, is transmitted to a content providing server. However, such an error information collecting method is not able to collect only desired reproduction quality information from the content providing server by limiting the desired reproduction quality information, and may unnecessarily increase a data transmission amount to the server because reproduction quality information that does not need to be collected is also transmitted.

Furthermore, recent content providing services provide a refund process by manually individually checking server logs or the like, upon a user's request for a refund of a content viewing price with respect to the reproduction quality of a content item. Therefore, there is a need for a method of enabling a user to conveniently receive a reward if the content reproduction quality does not meet a predefined condition.

DESCRIPTION OF EMBODIMENTS

Technical Problem

An embodiment of the present disclosure is to provide a display device and a server communicating with the display device, which are able to increase the convenience and satisfaction of a user who views content.

Specifically, an embodiment of the present disclosure is to provide a display device and a server for providing a method of enabling a user to more conveniently request a refund of a content viewing price when an error in the reproduction quality of a content item has occurred.

Specifically, an embodiment of the present disclosure is to provide a display device and a server, the display device receiving, from the server, a condition corresponding to a certain reproduction quality and providing a user with a method of requesting a refund, according to whether the reproduction quality of a content item being reproduced corresponds to the received condition.

Another embodiment of the present disclosure is to provide a display device and a server communicating with the same, which are capable of reducing data traffic when the server collects information on a reproduction quality.

Solution to Problem

According to an aspect of the present disclosure, a display device includes: a display; a communicator to communicate with a server; a memory storing at least one instruction; and a controller including at least one processor to execute at least one of the at least one instruction, wherein the processor is configured to receive a first condition corresponding to a certain reproduction quality from the server through the communicator, obtain reproduction quality information corresponding to the first condition upon reproduction of a first content item, transmit, to the server, first information including at least part of the reproduction quality information based on whether the reproduction quality information satisfies the first condition, and control a user interface screen including second information related to the reproduction quality information, to be output. Accordingly, the display device may automatically determine whether an error in a reproduction quality of the content has occurred, and may perform a refund process on a content viewing price according to specific refund criteria.

The first information may include at least one of information on an error occurring in reproducing the first content item, and information related to a delay occurring in buffering the first content item. Therefore, the display device may prevent unnecessary data transmission by transmitting only information related to the first condition to the server.

In addition, the processor may be further configured to determine whether the reproduction quality information satisfies the first condition, and transmit the first information or not transmit the first information based on a determination result. Accordingly, the display device may automatically determine whether the reproduction quality information obtained from the first content item satisfies the first condition, and may transmit the first information, thereby preventing unnecessary data from being transmitted to the server.

In addition, in a case where the reproduction quality information satisfies the first condition, the processor may be further configured to control the first content item to be continuously reproduced, and control the first information not to be transmitted to the server.

The second information may include information indicating a confirmation request method for confirming the reproduction quality information, and, in a case where the reproduction quality information does not satisfy the first condition, and a user input corresponding to a request for reproduction quality information confirmation is received through the user interface screen, the processor may be further configured to control a user interface screen including a refund request method for receiving a refund for a payment made to view the first content item, or including notification information regarding whether the first content item is refundable, to be output. That is, because the user may not want to request for the refund even if a reproduction quality condition of content does not satisfy the first condition, the refund process for the content viewing price may be performed only if the user input for the request for reproduction quality information confirmation is received, rather than unconditionally performed, and thus the user convenience may be improved.

The second information may include information indicating the refund request method for receiving a refund for the payment made to view the first content item, and the processor may be further configured to control the refund request to be transmitted to the server if the reproduction quality information does not satisfy the condition and the user input corresponding to a refund request is received through the user interface screen. That is, in a case where an error in the reproduction quality of the content has occurred, by transmitting the refund request to the server, rather than transmitting error information, the user convenience for refund processing on the content viewing price may be improved.

The second information may include at least one of the confirmation request method for confirming the reproduction quality information, refund criteria for receiving the refund for the payment made to view the first content item, or the refund request method for receiving the refund for the payment made to view the first content item. That is, in a case where an error in the reproduction quality of the content has occurred, the user may obtain information on a detailed refund request method or refund criteria, and thus the convenience for the refund processing on the content viewing price may be improved.

In addition, in a case where a user input for viewing the first content item is received, the processor may be further configured to control a user interface screen including information on the refund criteria according to the certain reproduction quality of the first content item, to be output before the payment is made to view the first content item. Accordingly, the user may confirm refund criterion information before receiving paid content, and thus convenience in the use of the content may be improved.

According to an embodiment of the present disclosure, a server includes: a communicator to communicate with a display device; a memory storing at least one instruction; and a controller including at least one processor to execute at least one of the at least one instruction, wherein the processor is configured to provide the display device with a first content item through the communicator, transmit a first condition related to a certain reproduction quality of the first content item, receive first information related to reproduction quality information of the first content item from the display device, and transmit second information related to the reproduction quality information of the first content item to the display device, and wherein the first information is received if the reproduction quality information of the first content item obtained when the display device reproduces the first content item, satisfies the transmitted first condition. That is, because the first information is received only if the first condition set by the server is not satisfied, unnecessary information may be prevented from being transmitted to the server.

The processor may be further configured to set, as the first condition, a condition for determining the reproduction quality related to at least one of information on an error occurring in reproducing the first content item, and information related to a delay occurring in buffering the first content item. Accordingly, a condition according to specific reproduction quality criteria may be set, and thus convenience of a content provider may be improved.

The processor may be further configured to control a user interface for setting or changing the first condition based on the first information, to be output. Accordingly, the content provider may dynamically change a condition for collecting the reproduction quality information of the content.

The first information may include at least one of information on an error occurring in reproducing the first content item, and information related to a delay occurring in buffering the first content item.

The second information may include at least one of the confirmation request method for confirming the reproduction quality information, the refund criteria for receiving the refund for the payment made to view the first content item, or the refund request method for receiving the refund for the payment made to view the first content item. Accordingly, the content provider may provide a detailed refund processing method for the content viewing price.

The processor may be further configured to control a user interface for setting or changing the second information to be output. Accordingly, the content provider may dynamically change the detailed refund processing method for the content viewing price.

In a case where the second information is the refund request method, and a user input for a refund request is received from the display device, the processor may be further configured to control refunding of costs corresponding to viewing of the first content item, to be performed.

In a case where a request for viewing the first content item is received from the display device before the first content item is provided to the display device through the communicator, the processor may be further configured to transmit, to the display device, information on refundability according to the certain reproduction quality of the first content item, before the payment is made to view the first content item. That is, the content provider may provide the information on the refund criteria, and thus the convenience for the refund processing on the content viewing price may be improved.

Advantageous Effects of Disclosure

A display device and a server communicating with the display device according to an embodiment of the present disclosure may improve convenience and efficiency of a content provider by enabling dynamic changes in a condition for collecting reproduction quality information of content.

In addition, the display device and the server communicating with the display device according to an embodiment of the present disclosure may provide a method for a user to more conveniently request a refund of a content viewing price, thereby improving user convenience and efficiency.

Furthermore, the display device and the server communicating with the display device according to an embodiment of the present disclosure may reduce data traffic in collecting information about reproduction quality.

MODE OF DISCLOSURE

Figure 1:
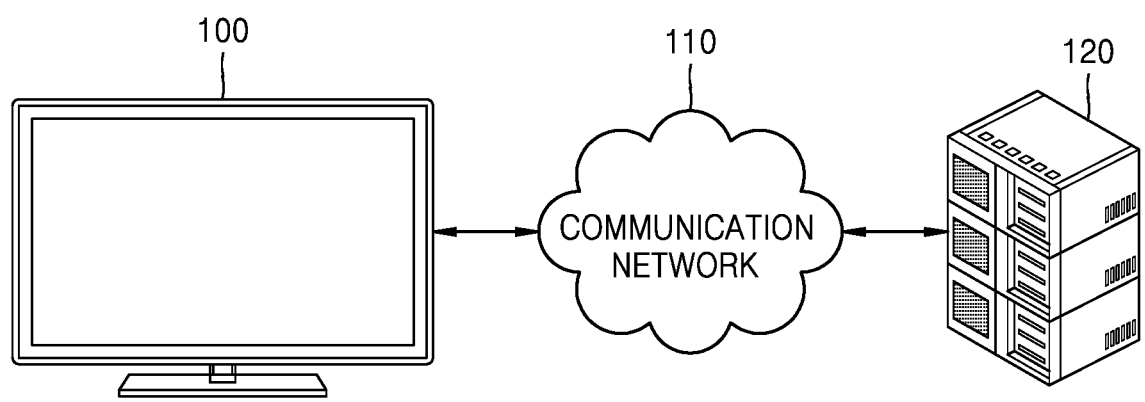
FIG. 1 is a diagram for explaining communication between a server and a display device, according to an embodiment of the present disclosure.

Hereinafter, embodiments of the present disclosure will be described in detail with reference to the accompanying drawings such that those of skill in the art may easily carry out the present disclosure. The present disclosure may, however, be embodied in many different forms and should not be understood as being limited to the example embodiments set forth herein. In the drawings, parts not related to the present disclosure may not be illustrated for clarity of explanation, and like reference numerals denote like elements.

Throughout the specification, it will be understood that when an element is referred to as being "connected to" another element, it may be "directly connected to" the other element or be "electrically connected to" the other element through an intervening element. It will be further understood that the terms "includes" and/or "including" specify the presence of stated elements, but do not preclude the presence or addition of one or more other elements, unless the context clearly indicates otherwise.

Herein, expressions such as "some embodiments of the present disclosure" and "an embodiment of the present disclosure" do not always designate the same embodiment(s).

Some embodiments of the present disclosure may be described in terms of functional blocks and various processing steps. Some or all of the functional blocks may be implemented by any number of hardware and/or software elements perform certain functions. For example, the functional blocks of the present disclosure may be implemented by one or more processors or microprocessors, or circuit elements for certain functions. As another example, the functional blocks of the present disclosure may be implemented using various programming or scripting languages. The functional blocks may be implemented using various algorithms executed by one or more processors. Furthermore, the present disclosure may employ known technologies for electronic settings, signal processing, and/or data processing. Terms such as "module", "element", etc. may be widely used and are not limited to mechanical and physical elements.

In addition, connection lines or connection members between elements illustrated in the drawings are merely exemplary of functional connections and/or physical or circuit connections. It should be noted that many alternative or additional functional connections, physical connections or circuit connections may be present in a practical device.

In addition, the expression "at least one of A and B" means "A or B" or "A and B".

Hereinafter, the present disclosure will be described in detail with reference to the accompanying drawings.

FIG. 1 is a diagram for explaining communication between a server and a display device according to an embodiment of the present disclosure.

Referring to FIG. 1, a display device 100 according to an embodiment of the present disclosure may include all electronic devices that visually output certain content. Specifically, the display device 100 according to an embodiment of the present disclosure includes all electronic devices capable of selectively displaying at least one content item, and may be provided in various forms, for example, a TV, a digital broadcast terminal, a tablet PC, a mobile phone, a computer, or a laptop computer. The display device 100 may be not only stationary but also portable or carriable by a user.

In an embodiment of the present disclosure, a communication network 110 may be a wired and/or wireless communication network, for example, various communication networks 110 such as a local area network (LAN), a metropolitan area network (MAN), a wide area network (WAN), and a world wide web (WWW).

In addition, a server 120 according to an embodiment of the present disclosure may communicate with the display device 100 through the communication network 110, and may transmit a condition corresponding to a certain reproduction quality of a content item according to a request of the display device 100 and manage information received from the display device 100. Furthermore, the server 120 may control outputting of a user interface screen on the display device 100 through the communication network 110.

Figure 2:
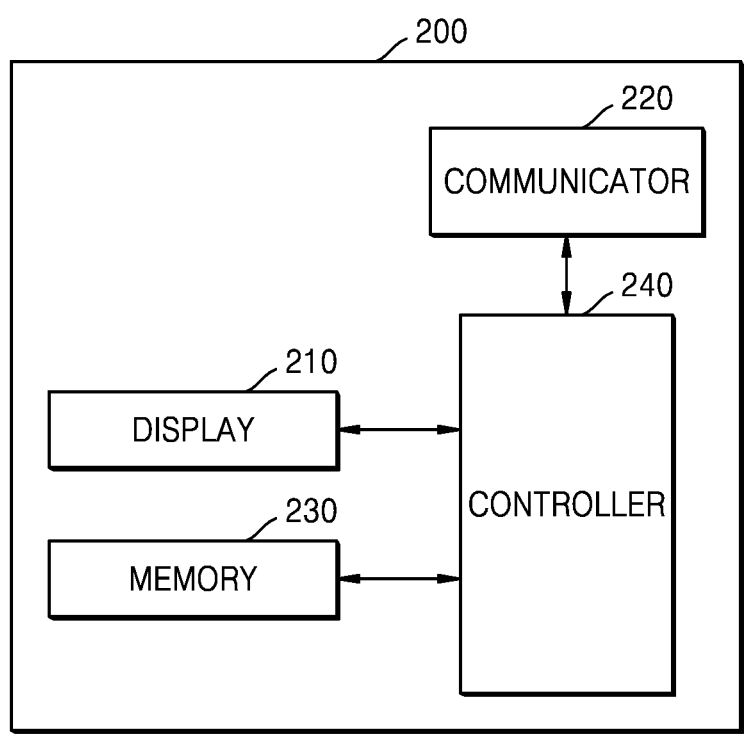
FIG. 2 is a block diagram illustrating a display device according to an embodiment of the present disclosure.

FIG. 2 is a block diagram illustrating a display device according to an embodiment of the present disclosure. The display device 200 according to an embodiment of the present disclosure may equally correspond to the display device 100 described with reference to FIG. 1.

Referring to FIG. 2, the display device 200 according to an embodiment of the present disclosure may include a display 210, a communicator 220 to communicate with an external server (not shown), a memory 230, and a controller 240 including at least one processor (not shown) to execute one or more instructions.

In an embodiment of the present disclosure, the display device 100 may include the display 210, the communicator 220 to communicate with a server, the memory 230 storing at least one instruction, and the controller 240 including at least one processor for executing at least one of the at least one instruction. Here, the processor may receive a first condition corresponding to a certain reproduction quality from the server through the communicator, obtain reproduction quality information corresponding to the first condition upon reproduction of a first content item, transmit, to the server, first information which is at least part of the reproduction quality information based on whether the reproduction quality information satisfies the first condition, and control a user interface screen including second information related to the reproduction quality information, to be output.

Specifically, the display 210 may output an image corresponding to video data through an internally included display panel to allow the user to visually recognize the video data.

The communicator 220 may communicate with an external device (not shown) to receive at least one certain content item transmitted through a certain channel. Specifically, the communicator 220 may receive at least one of a plurality of content items corresponding to a plurality of channels. Here, the channel may be a broadcast channel. In addition to the broadcast channel, the channel may refer, for example, to a content transmission path corresponding to a content provider that transmits certain content. For example, the channel may refer, for example, to a transmission path through which a video on demand (VoD) service and/or a streaming content providing service are/is transmitted in addition to the broadcast channel, and may be represented in the form of a certain number, a certain character, or a combination of the certain character and the certain number like the broadcast channel. For example, a certain streaming movie providing service may be received through channel '20', and a user of the display device 200 may view movie content provided by the certain streaming movie providing service when selecting channel '20'.

The communicator 220 may communicate with external devices (not shown) through a wired or wireless network. Here, the external device (not shown) may be a device capable of transmitting certain content to the display device 200 through a certain channel, and may include a broadcasting station server, a content provider server, and a content storage device.

The communicator 220 according to an embodiment of the present disclosure may include at least one communication module such as a short-range communication module, a wired communication module, a mobile communication module, a broadcast receiving module, etc. Here, the at least one communication module may refer to a communication module capable of transmitting and receiving data through a network conforming to communication standards such as a tuner performing broadcast receiving, Bluetooth, wireless LAN (WLAN, Wi-Fi), wireless broadband (Wibro), worldwide interoperability for microwave access (Wimax), CDMA, or WCDMA.

The controller 240 may include at least one processor (not shown) to execute at least one instruction. Each of the at least one processor may perform a certain operation by executing at least one of the one or more instructions stored in the memory 230.

Each of the at least one processor (not shown) may also perform a certain operation by executing at least one of the one or more instructions stored in the controller 240.

In addition, the at least one processor included in the controller 240 may control operations performed in the display device 200, and may control other elements included in the display device 200 to perform a certain operation. Therefore, although it is described below that the controller 240 controls certain operations to be performed, it will be easily understood that the at least one processor included in the controller 240 may control the certain operations to be performed.

In addition, the controller 240 may include an internal memory (not shown) and at least one processor (not shown) to execute at least one stored program. Specifically, the internal memory (not shown) of the controller 240 may store one or more instructions. The at least one processor (not shown) included in the controller 240 may execute at least one of one or more instructions stored in an internal memory (not shown) of the controller 240 to perform a certain operation.

Specifically, the controller 240 may include RAM (not shown) storing signals or data input from outside the display device 200 or used as a storage area for various operations performed by the display device 200, ROM (not shown) storing a plurality of instructions and/or a control program for controlling the display device 200, and at least one processor (not shown). The processor (not shown) may include a graphic processing unit (not shown) for processing graphics corresponding to video data. The processor (not shown) may be implemented as a system on chip (SoC) in which a core (not shown) is integrated with a GPU (not shown). The processor (not shown) may include a single core, dual cores, triple cores, quad cores, or cores corresponding to a multiple thereof.

Hereinafter, for convenience of explanation, an example in which, when the controller 240 performs or controls a certain operation, the processor (not shown) of the controller 240 performs the certain operation by executing at least one instruction stored in the memory 230 will be described.

The memory 230 may include at least one of flash memory, a hard disk, a multimedia card micro, card-type memory (e.g., SD or XD memory), random access memory (RAM), static random access memory (SRAM), read-only memory (ROM), electrically erasable programmable read-only memory (EEPROM), programmable read-only memory (PROM), magnetic memory, a magnetic disc, or an optical disc.

The controller 240 may receive the condition corresponding to the certain reproduction quality through the communicator 220 and control the received condition to be stored in the memory 230. Meanwhile, because certain reproduction qualities required for content items and their corresponding conditions may be different from each other, the memory 230 may store each condition required for each content.

Types and requirements of the reproduction qualities required for the content items may be different from each other, for example, a first content item to be reproduced in an HD or higher resolution (a first condition), a second content item to be reproduced in a 4 k or higher resolution (a second condition), and a third content item to be reproduced with an accumulated buffering time of 5 minutes or less (a third condition), and thus the memory 230 may store the first to third conditions corresponding to the first to third content items. In addition, the memory 230 may store a fourth condition including a plurality of conditions corresponding to various reproduction qualities. For example, the fourth condition including both the second condition and the third condition may be reproduction in a 4 k or higher resolution and with an accumulated buffering time of 5 minutes or less.

As the condition corresponding to the certain reproduction quality for each content item is stored in the memory 230, the controller 240 may determine the reproduction quality information of the first content item based on the first condition if the user reproduces the first content item, and may determine the reproduction quality information of the second content item based on the second condition if the user reproduces the second content item.

That is, the display device 200 may receive a specific condition for each content item being reproduced, and accordingly, the user may be provided with information on specific refund criteria or refundability corresponding to various reproduction qualities for each content item.

Hereinafter, for convenience of explanation, according to embodiments of the present disclosure, description will be based on the first content item, but the same operations may be performed for the second to nth content items.

The controller 240 may obtain the reproduction quality information corresponding to the first condition, upon the reproduction of the first content item and control the obtained reproduction quality information to be stored in the memory 230.

The reproduction quality information stored in the memory 240 may be continuously updated and stored over time. For example, after a certain event corresponding to the first condition occurs, the reproduction quality information may be updated whenever the certain event is input. Therefore, if the first condition is 'the number of buffering events of 5 or less', and the first content item had been reproduced for 30 minutes with the number of buffering events of 3, and then the rest of the first content item is reproduced the next day with the number of buffering events of 3, the reproduction quality information may be updated with the number of buffering events of 6.

Here, the reproduction quality information of the first content item may be obtained according to the first condition, under the control of the controller 240. Specifically, if the first condition is 'the number of buffering events of 5 or less', the obtained reproduction quality information of the first content item may include information for determining the number of buffering events. For example, the information for determining the number of buffering events may include a start time point of content reproduction (or a channel entry time point in a case of automatic reproduction after channel entry), a bit rate in normal reproduction, every changed bit rate, or an end time point of content reproduction.

In addition, the controller 240 may determine whether the first condition is satisfied according to the obtained reproduction quality information.

For example, the controller 24 may determine the number of buffering events by counting a number of changes in the bit rate whenever the bit rate is changed, based on a bit rate when the reproduction is normally performed, from the start time point to the end time point of the reproduction. That is, the controller 240 may automatically obtain the reproduction quality information in order to determine whether the first condition is satisfied, and thus the efficiency may be increased as compared to a conventional method in which a server checks logs or the like manually and individually, upon a user's request.

The controller 240 may determine whether the obtained reproduction quality information of the first content item satisfies the first condition, and may control the first information to be transmitted or not to be transmitted to the server.

Specifically, the processor (not shown) may determine whether the reproduction quality information satisfies the first condition, and may transmit the first information or may not transmit the first information based on a determination result.

For example, if the first condition is 'the number of buffering events of 5 or less', and the obtained reproduction quality information of the first content item is the number of buffering events of 6, that is, the first condition is not satisfied, the first information related to the reproduction quality information may be transmitted to the server. On the other hand, if the obtained reproduction quality information of the first content item is the number of buffering events of 1, that is, the first condition is satisfied, the first information related to the reproduction quality information may not be transmitted to the server.

According to an embodiment of the present disclosure, the reproduction quality information may include information related to a certain reproduction quality that may be generated when reproducing a content item, in addition to the information related to a delay occurring in buffering the content item. For example, the reproduction quality information may include information such as deterioration in resolution, a synchronization error, abnormal termination of reproduction of a content item, whether an advertisement is included.

Hereinafter, for convenience of explanation, the term "event" refers to an event related to a certain reproduction quality.

According to an embodiment of the present disclosure, the first information may include at least part of the reproduction quality information.

The first information related to the reproduction quality information to be transmitted to the server may include at least one of an event type (e.g., buffering, synchronization error, deterioration in resolution, etc.), a pre-event section state, a pre-event section start offset, a pre-event section end offset, a time set in the display device 200, a reproduction ID (a random ID generated upon a channel connection or execution of a certain application), additional information on the event type, a user input, a channel change, a user event, error information, a bit rate, an event occurrence position, an event cause (e.g., a detailed error information, a network error, a buffering cause, etc.), a user ID (an account ID), a display device ID (DUID), a country code, platform information (a display device model, an application, player version information, etc.), a network bandwidth, or a network connection type, but is not limited thereto, and may include information for determining whether the reproduction quality information satisfies the first condition.

When the server determines whether an error occurs in the reproduction of the first content, the display device 200 has to transmit the reproduction quality information corresponding to all events, and thus a large amount of data is transmitted to the server. However, as described above, if the display device 200 first determines whether the obtained reproduction quality information satisfies the first condition and controls the first information to be transmitted only when the reproduction quality information does not satisfy the first condition, unnecessary data transmission to the server may be reduced.

According to an embodiment of the present disclosure, the first information may include at least one of information on an error occurring in reproducing the first content item, or information related to a delay occurring in buffering the first content item.

For example, if the first condition is "the number of buffering events of 10 or less, and an accumulated buffering time of 5 minutes or less", the controller 240 may obtain reproduction quality information indicating an accumulated buffering time and the number of buffering events in the reproduction of the first content item and store the obtained reproduction quality information in the memory 230. Here, because the controller 240 may store the obtained reproduction quality information is accumulated and stored in the memory 230, the controller 240 may determine whether the first condition is satisfied according to the reproduction quality information (e.g., the accumulated buffering time or the number of buffering events) stored in the memory 230 even if the reproduction of the first content item had been stopped in the middle and then is resumed.

Conventionally, because the display device transmits error information whenever an error occurs in reproducing a content item, there is an inconvenience of transmitting the error information even when the error is actually not related to a reproduction quality, such as an error due to a temporary communication error. On the other hand, according to an embodiment of the present disclosure, it is possible to objectively determine whether the reproduction quality information of the content item meets a specific condition.

In addition, the memory 230 may store the first information including at least part of the reproduction quality information obtained according to the first condition when reproducing the first content item, and may receive, from the server, third information related to the reproduction quality information of the first content item and store the third information.

The third information is information associated with the first condition, and may be received from the server and stored in the memory 230. The controller 240 may receive, from the server, the third information while receiving the first condition corresponding to the certain reproduction quality of the first content item, and may receive the third information from the server after determining whether the reproduction quality information of the content item satisfies the first condition.

Here, the third information may include information depending on whether the first condition is satisfied or the first condition is not satisfied. For example, the third information may include information on a refund request method for a content viewing price, or whether the content viewing price is refundable, that is provided if the reproduction quality information of the first content item does not satisfy the first condition.

If the reproduction quality information does not satisfy the first condition, the controller 240 may control a user interface screen including the second information to be output, based on the third information stored in the memory 230.

The second information may include information indicating the refund request method for receiving a refund for a payment made to view the first content item, and, if the reproduction quality information corresponds to the condition and a user input corresponding to a refund request is received through the user interface screen, the processor (not shown) may control the refund request to be transmitted to the server.

In addition, the second information may include at least one of a reproduction quality information confirmation request method, the refund request method corresponding to the payment made to view the first content item, and information related to refund criteria (e.g., a notification message indicating the refund criteria) corresponding to the payment made to view the first content item.

Detailed operations related to this will be described in detail with reference to FIGS. 4 to 11.

A user interface (not shown) may receive a user input for controlling the display device 200. The user interface may include a user input device including a touch panel that senses a touch of the user, a button that receives a push operation of the user, a wheel that receives a rotation operation of the user, a keyboard, a dome switch, etc., but is not limited thereto. In addition, if the display device 200 operates by a remote controller (not shown), the user interface 210 may receive a control signal received from the remote controller (not shown).

In an embodiment of the present disclosure, when a user input corresponding to the second information is received, the user interface may transmit the user input to the controller 240. Accordingly, based on the second information included in the user interface, the controller 240 may perform confirmation of the reproduction quality information, transmit, to the server, the refund request corresponding to the payment made to view the first content item, or control notification information on refundability of the payment made to view the first content item, or refund criterion information, to be output.

Figure 3:
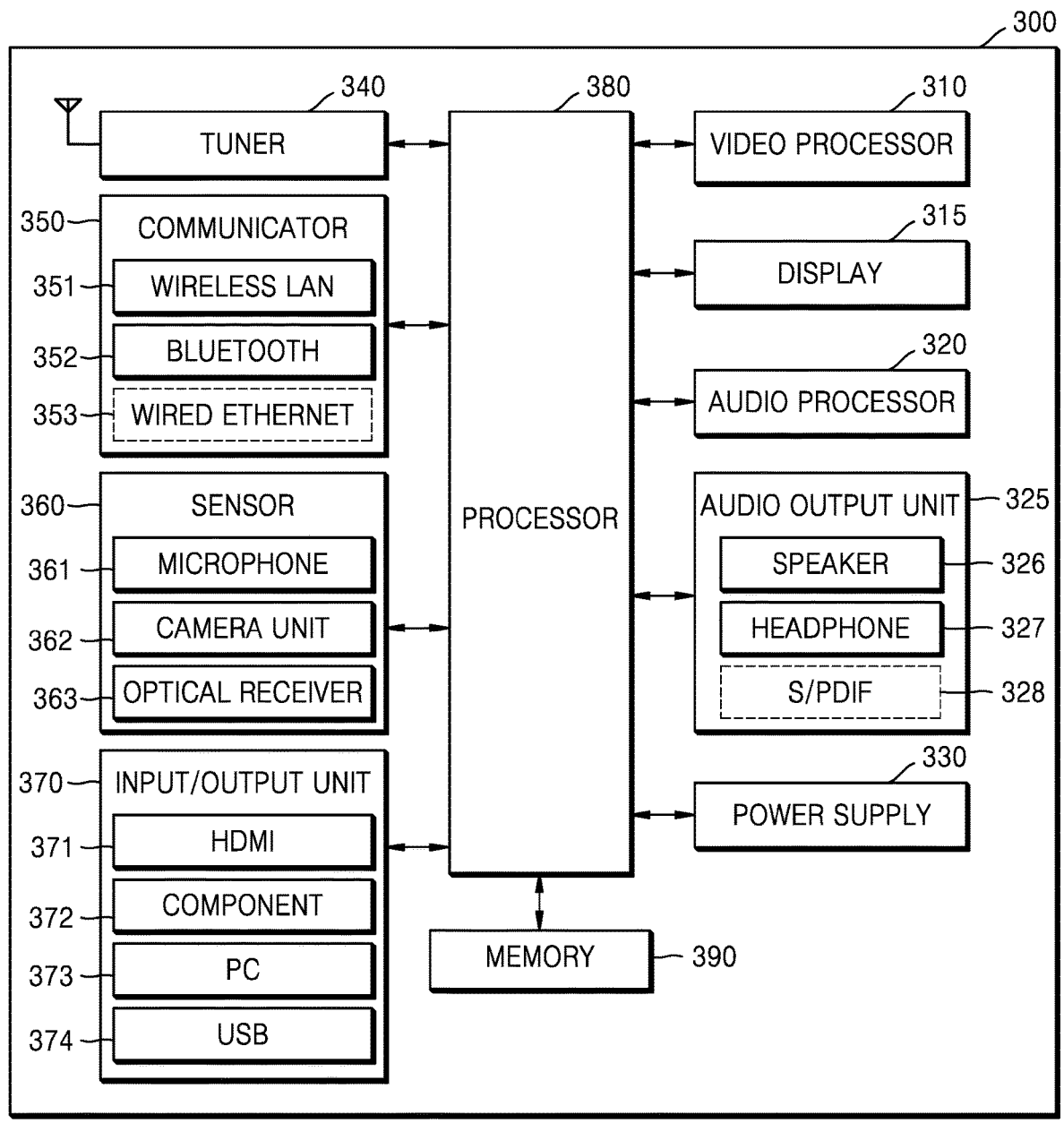
FIG. 3 is a detailed block diagram illustrating a display device according to an embodiment of the present disclosure.

In an embodiment of the present disclosure, the display device 200 may further include a sensor (not shown) (corresponding to 360 of FIG. 3). The sensor (not shown) may sense voice of the user, an image of the user, or an interaction of the user. Specifically, the sensor (not shown) may sense an interaction for turning on the display device 200, an interaction for changing a content item being output by the display device 200, an interaction for confirming quality information of the content item being reproduced on the display device 200, an interaction for transmitting the refund request from the display device 200 to the server, etc. The sensor (not shown) may transfer the sensed interaction to the controller 240. Then, the controller 240 may determine that a certain operation has been requested based on a result of sensing by the sensor (not shown).

If it is determined that the certain operation has been requested, the controller 240 may perform the confirmation of the reproduction quality information, transmit, to the server, the refund request corresponding to the payment made to view the first content item, or control the notification information on the refundability of the payment made to view the first content item, or the refund criterion information, to be output.

Hereinafter, embodiments in which the first content item is indicated as having an HD resolution, and the user has paid a content viewing price to view the first content item will be described. In a case where the first content item has not been reproduced in the HD resolution for more than a predefined time, the server providing the first content item has to refund at least part of the content viewing price to the user. In this case, the communicator 220 of the display device 100 may receive, from the server 120, data including a reproduction quality condition that is 'reproduction in an HD or higher resolution' as the first condition. Then, the controller 240 of the display device 200 may obtain the reproduction quality information which is information on whether the first content item is reproduced in an HD resolution. For example, the reproduction quality information corresponding to the first condition may include at least one of information indicating that the first content item is not reproduced in an HD or higher resolution, information on a reproduction time section in which the first content item is not reproduced in an HD or higher resolution, and information on a resolution in which the first content item is reproduced.

In addition, the controller 240 may transmit at least part of the reproduction quality information corresponding to the first information to the server 120, based on whether the reproduction quality information satisfies the first condition that is 'reproduction in an HD or higher resolution'. For example, when the first content is not being reproduced in an HD or higher resolution, the controller 240 may transmit the first information including at least one of information indicating that the first content item is not reproduced in an HD or higher resolution, information on a reproduction time section in which the first content item is not reproduced in an HD or higher resolution, and information on a resolution in which the first content item is reproduced. In addition, the controller 240 may control the user interface screen including the second information related to the reproduction quality information corresponding to the first condition, to be output. Here, the second information may include the reproduction quality information corresponding to the first condition, information on whether the reproduction quality of the first content item satisfies the first condition based on the reproduction quality information (e.g., a message such as 'The first content item is now being reproduced in an HD or less resolution'), and information on whether the user is eligible to request a refund according to whether the reproduction quality of the first content item satisfies the first condition (e.g., a message such as 'The first content item is now being reproduced in an HD or less resolution, so you can request a refund.'). In addition, because the user may want to continue viewing, regardless of whether the reproduction quality information of the first content item satisfies the first condition, the second information may include a certain key menu (e.g., a certain key menu for requesting confirmation of the reproduction quality information is output on one region of a screen for the reproduction of the first content item, and the reproduction of the content item may be resumed if there is no user input corresponding to the key menu) for requesting confirmation of the reproduction quality information.

In addition, if a user input corresponding to the refund request or the reproduction quality information confirmation request is received through the user interface screen including the second information, the server may receive the first information and perform a refund procedure for at least part of a first content viewing price. Accordingly, the user's convenience and satisfaction for refunding of the content viewing price may be increased.

FIG. 3 is a detailed block diagram illustrating a display device according to an embodiment of the present disclosure. The display device 300 according to an embodiment of the present disclosure may equally correspond to the display device 200 described with reference to FIG. 2. Specifically, the display 315, the communicator 350, the memory 390, and the processor 380 of the display device 300 may correspond to the display 210, the communicator 220, the memory 230, and the controller 240 of the display device 200 illustrated in FIG. 2, respectively. In addition, the display device 300 may further include an element corresponding to the user interface (not shown) in addition to the elements shown in FIG. 3.

Therefore, in describing the display device 300, description that had been provided in connection with FIGS. 1 and 2 will be omitted.

Referring to FIG. 3, the display device 300 may include a video processor 310, a display 315, an audio processor 320, an audio output unit 325, a power supply 330, a tuner 340, a communicator 350, a sensor 360, an input/output unit 370, a controller 380, and a memory 390.

The video processor 310 may process video data received by the display device 300. The video processor 310 may perform various image processing operations such as decoding, scaling, noise filtering, frame rate conversion, and resolution conversion, on the video data.

The controller 380 may receive a request to record the video data processed by the video processor 310, and control the video data to be encoded and recorded on a memory device (not shown), for example, RAM (not shown), included in the controller 380 or the memory 390.

The display 315 may display a video included in a broadcast signal received through the tuner 340 on a screen under the control of the controller 380. The display 315 may also display content (e.g., a moving image) input through the communicator 350 or the input/output unit 370.

The display 315 may output an image stored in the memory 390 under the control of the controller 380. The display 315 may display a voice UI (e.g., including a voice instruction guide) for performing a voice-recognized task corresponding to recognized voice, or a motion UI (e.g., including a user motion guide for motion recognition) for performing a motion-recognized task corresponding to a recognized motion.

The audio processor 320 processes audio data. The audio processor 320 may perform various processing operations such as decoding, amplification, and noise filtering, on the audio data. The audio processor 320 may include a plurality of audio processing modules to process audio data corresponding to a plurality of content items.

The audio output unit 325 may output audio included in the broadcast signal received through the tuner 340 under the control of the controller 380. The audio output unit 325 may output audio (e.g., voice or sound) input through the communicator 350 or the input/output unit 370. The audio output unit 325 may output audio stored in the memory 390 under the control of the controller 380. The audio output unit 325 may include at least one of a speaker 326, a headphone output port 327, and a Sony/Philips digital interface (S/PDIF) output port 328. The audio output unit 325 may include a combination of the speaker 326, the headphone output port 327, and the S/PDIF output port 328.

The power supply 330 supplies power input from an external power source to the elements 310 to 390 in the display device 300 under the control of the controller 380. In addition, the power supply 330 may supply power output from one or more batteries (not shown) located in the display device 300, to the internal elements 310 to 390, under the control of the controller 380.

The tuner 340 may be tuned to and select only a frequency of a channel desired to be received by the display device 300 from among many radio wave components by performing, for example, amplification, mixing, and resonance on a broadcast signal received in a wired or wireless manner. The broadcast signal includes audio, video, and additional information (e.g., an electronic program guide (EPG)).

Specifically, the tuner 340 may selectively receive a broadcast signal and/or an image signal received in corresponding to a certain channel.

The tuner 340 may receive the broadcast signal in a frequency band corresponding to a channel number (e.g., cable broadcast 506) according to a user input. Here, the user input may be a control signal received from an external control device (not shown) or a remote controller (not shown), for example, a channel number input, a channel up-down input, and a channel input on an EPG screen. In addition, the user input may be an input for generating a certain event.

The tuner 340 may receive the broadcast signal from various sources such as terrestrial, cable, satellite, and Internet broadcasters. The tuner 340 may receive the broadcast signal from sources such as analog or digital broadcasters. The broadcast signal received through the tuner 340 may be decoded (e.g., audio-decoded, video-decoded, or additional-information-decoded) and separated into the audio, video, and/or additional information. The separated audio, video and/or additional information may be stored in the memory 390 under the control of the controller 380.

The display device 300 may include one or more tuners 340. When a plurality of tuners 340 are included according to an embodiment of the disclosure, a plurality of broadcast signals may be output on a plurality of windows included in a multi-window screen provided on the display 315.

The tuner 340 may be integrated with the display device 300 in the form of an all-in-one device, or be implemented as a separate device having a tuner electrically connected to the display device 300 (e.g., a set-top box (not shown) or a tuner (not shown) connected to the input/output unit 370).

The communicator 350 may connect the display device 300 to an external device (e.g., an audio device, etc.) under the control of the controller 380. The controller may transmit or receive content to or from the connected external device, download an application from the external device, or perform web browsing through the communicator 350. Specifically, the communicator 350 may access a network to receive content from an external device (not shown).

As described above, the communicator 350 may include at least one of a short-range wireless communication module (not shown), a wired communication module (not shown), or a mobile communication module (not shown).

FIG. 3, illustrates an example in which the communicator 350 includes at least one of a wireless LAN module 351, a Bluetooth module 352, and a wired Ethernet module 353.

The communicator 350 may include a combination of the wireless LAN module 351, the Bluetooth module 352, and the wired Ethernet module 353. In addition, the communicator 350 may receive a control signal of a control device (not shown) under the control of the controller 380. The control signal may be implemented as a Bluetooth type, an RF signal type, or a Wi-Fi type.

The communicator 350 may further include a near field communication (NFC) module (not shown) or a separate Bluetooth low energy (BLE) module (not shown), in addition to the Bluetooth module.

In addition, in FIG. 3, the tuner 340 and the communicator 350 may correspond to the communicator 220 of FIG. 2, and may be implemented in which the communicator 350 further includes the tuner 340.

The sensor (not shown) may sense a voice of a user, an image of the user, or an interaction of the user.

A microphone 361 may receive voice uttered by the user. The microphone 361 may convert the received voice into an electrical signal and output the electrical signal to the controller 380. The voice of the user may include, for example, voice corresponding to a menu or a function of the display device 300. For example, a recognition range of the microphone 361 is recommended within a distance of 4 m from the microphone 361 to the location of the user, and may vary depending on a voice volume of the user and an ambient environment (e.g., a speaker volume and ambient noise).

The microphone 361 may be integrated with or separated from the display device 300. The separated microphone 361 may be electrically connected to the display device 300 through the communicator 350 or the input/output unit 370.

It will be understood by those of skill in the art that the microphone 361 may be excluded depending on the performance and structure of the display device 300.

A camera unit 362 may receive an image (e.g., consecutive frames) corresponding to a motion of the user, including a gesture, in a recognition range of a camera. For example, the recognition range of the camera unit 362 may be within a distance of 0.1 m to 5 m from the camera unit 362 to the user. The motion of the user may include, for example, a gesture or motion of a body part of the user, such as the face, a face expression, a hand, a fist, or a finger. The camera unit 362 may convert a received image into an electrical signal and output the electrical signal to the controller 380 under the control of the controller 380.

The controller 380 may select a menu to be displayed on the display device 300 or perform a control operation based on the received motion recognition result. For example, channel adjustment, volume adjustment, and indicator movement may be included.

The camera unit 362 may include a lens (not shown) and an image sensor (not shown). The camera unit 362 may support optical zoom or digital zoom using a plurality of lenses and image processing. The recognition range of the camera unit 362 may be variously set according to an angle of the camera and an ambient environment condition. When the camera unit 362 includes a plurality of cameras, a three-dimensional still image or a three-dimensional motion may be received using the plurality of cameras.

The camera unit 362 may be integrated with or separate from the display device 300. A separate device (not shown) including the separate camera unit 362 may be electrically connected to the display device 300 through the communicator 350 or the input/output unit 370.

It will be understood by those of skill in the art that the camera unit 362 may be excluded depending on the performance and structure of the display device 300.

An optical receiver 363 may receive an optical signal (including a control signal) from an external control device (not shown) through an optical window (not shown) of a bezel of the display 315. The optical receiver 363 may receive, from the external control device (not shown), an optical signal corresponding to a user input (e.g., touch, push, a touch gesture, voice, or a motion). A control signal may be extracted from the received optical signal under the control of the controller 380.

For example, the optical receiver 363 may receive a signal corresponding to a pointing position of the control device (not shown) and transmit the signal to the controller 380. For example, when a UI screen for receiving data or a command from the user is output on the display 315 and the user desires to input data or a command to the display device 300 through the control device (not shown), and the user moves the control device (not shown) while touching a finger on a touch pad (not shown) provided on the control device (not shown), the optical receiver 363 may receive a signal corresponding to the motion of the control device (not shown), and transmit the signal to the controller 380. In addition, the optical receiver 363 may receive a signal indicating that a specific button provided on the control device (not shown) is pressed, and transmit the signal to the controller 380. For example, when the user presses, with a finger, a button-type touch pad (not shown) provided on the control device (not shown), the optical receiver 363 may receive a signal indicating that the button-type touch pad is pressed, and transmit the signal to the controller 380. For example, the signal indicating that the button-type touch pad is pressed may be used as a signal for selecting one of items.

The input/output unit 370 may receive video (e.g., a moving image), audio (e.g., voice or music), and additional information (e.g., an electronic program guide (EPG)) from outside the display device 300 under the control of the controller 380. The input/output unit 370 may include any one of a high-definition multimedia interface (HDMI) port 371, a component jack 372, a PC port 373, and a USB port 374. The input/output unit 370 may include a combination of the HDMI port 371, the component jack 372, the PC port 373, and the USB port 374.

It will be understood by one of ordinary skill in the art that the configuration and operation of the input/output unit 370 may be implemented in various ways according to an embodiment of the present disclosure.

The controller 380 may control overall operations of the display device 300 and signal flows between internal components (not shown) of the display device 300, and may process data. When a user input is received or a preset and stored condition is satisfied, the controller 380 may execute an operating system (OS) and various applications stored in the memory 390.

The controller 380 may include RAM (not shown) storing signals or data input from outside the display device 300 or used as a storage area for various operations performed by the display device 300, ROM (not shown) storing a control program for controlling the display device 300, and a processor (not shown).

The processor may include a GPU (not shown) for processing graphics corresponding to video. The processor may be implemented as a system on chip (SOC) in which a core (not shown) is integrated with a GPU (not shown). The processor may include a single core, dual cores, triple cores, quad cores, or cores corresponding to a multiple thereof.

The processor (not shown) may include a plurality of processors. For example, the processor (not shown) may include a main processor (not shown) and a sub-processor operating in a sleep mode.

The graphic processing unit (not shown) may generate a screen including various objects such as an icon, an image, and a text using a calculator (not shown) and a renderer (not shown). The calculation unit may calculate attribute values such as a coordinate, a shape, a size, and a color of each object to be displayed, based on a screen layout using a user interaction sensed by the sensor (not shown). The renderer generates a screen of various layouts including objects, based on the attribute values calculated by the calculator. The screen generated by the renderer is displayed in a display area of the display 315.

According to an embodiment of the present disclosure, when a user input is received on the user interface screen including the second information, the controller 380 may perform at least one operation of a confirmation request for the quality information of the content item, a refund request for the payment made to view the content item, or a refund criterion request for the payment made to view the content item.

Hereinafter, detailed operations of the display device and the server for controlling refunding based on the reproduction quality information of the content item according to an embodiment of the present disclosure will be described in detail with reference to the display device 200 illustrated in FIG. 2 and with reference to FIGS. 4 to 11.

Figure 4:
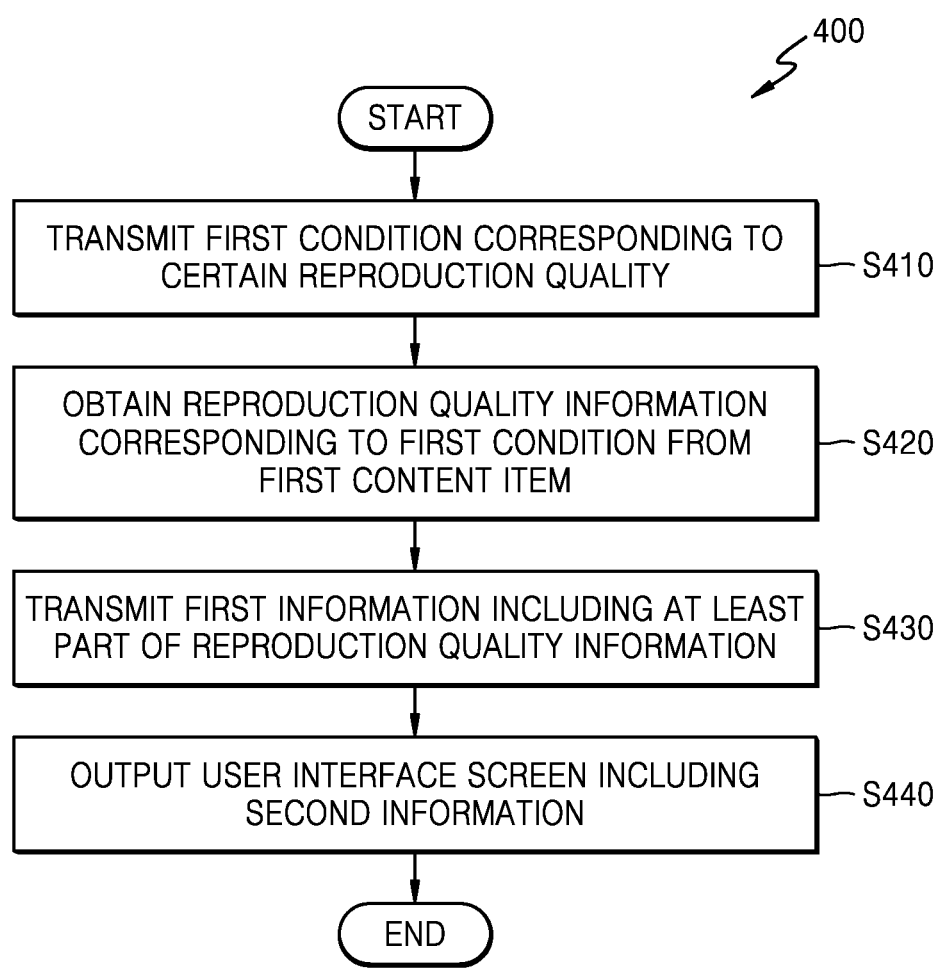
FIG. 4 is a flowchart for explaining operations performed in a display device, according to an embodiment of the present disclosure.

FIG. 4 is a flowchart for explaining operations performed in a display device according to an embodiment of the present disclosure. The flowchart illustrated in FIG. 4 is a flowchart illustrating operations 400 of the display device according to an embodiment of the present disclosure. The operations 400 of the display device according to an embodiment of the present disclosure may be performed by the display device 200 according to an embodiment of the present disclosure described with reference to FIG. 2. Therefore, in describing the operations 400 of the display device, description that had been provided in connection with FIGS. 1 to 3 will be omitted.

Referring to FIG. 4, the operations 400 of the display device according to an embodiment of the present disclosure include receiving the first condition corresponding to the certain reproduction quality (S410). Operation S410 may be performed by receiving the first condition corresponding to the certain reproduction quality from the server through the communicator 220. The first condition obtained from the server through the communicator 220 may be stored in the memory 230 under the control of the controller 240.

When a certain event occurs, the reproduction quality information of the first content item may obtained based on the condition obtained in operation S410 (S420). Operation S420 may be performed under the control of the controller 240.

In addition, if the obtained reproduction quality information of the first content item satisfies the first condition received from the server, the first information including at least part of the reproduction quality information may be transmitted under the control of the controller 240 (S430). If the reproduction quality information does not satisfy the first condition, the reproduction of the first content item may be controlled to be resumed, and the first information may be controlled not to be transmitted to the server.

In addition, the user interface screen including the second information may be controlled to be output under the control of the controller 240 (S440). Here, the second information may include at least one of the reproduction quality information confirmation request method, the refund request method corresponding to the payment made to view the first content item, and the refund criteria corresponding to the payment made to view the first content item.

Figure 5:
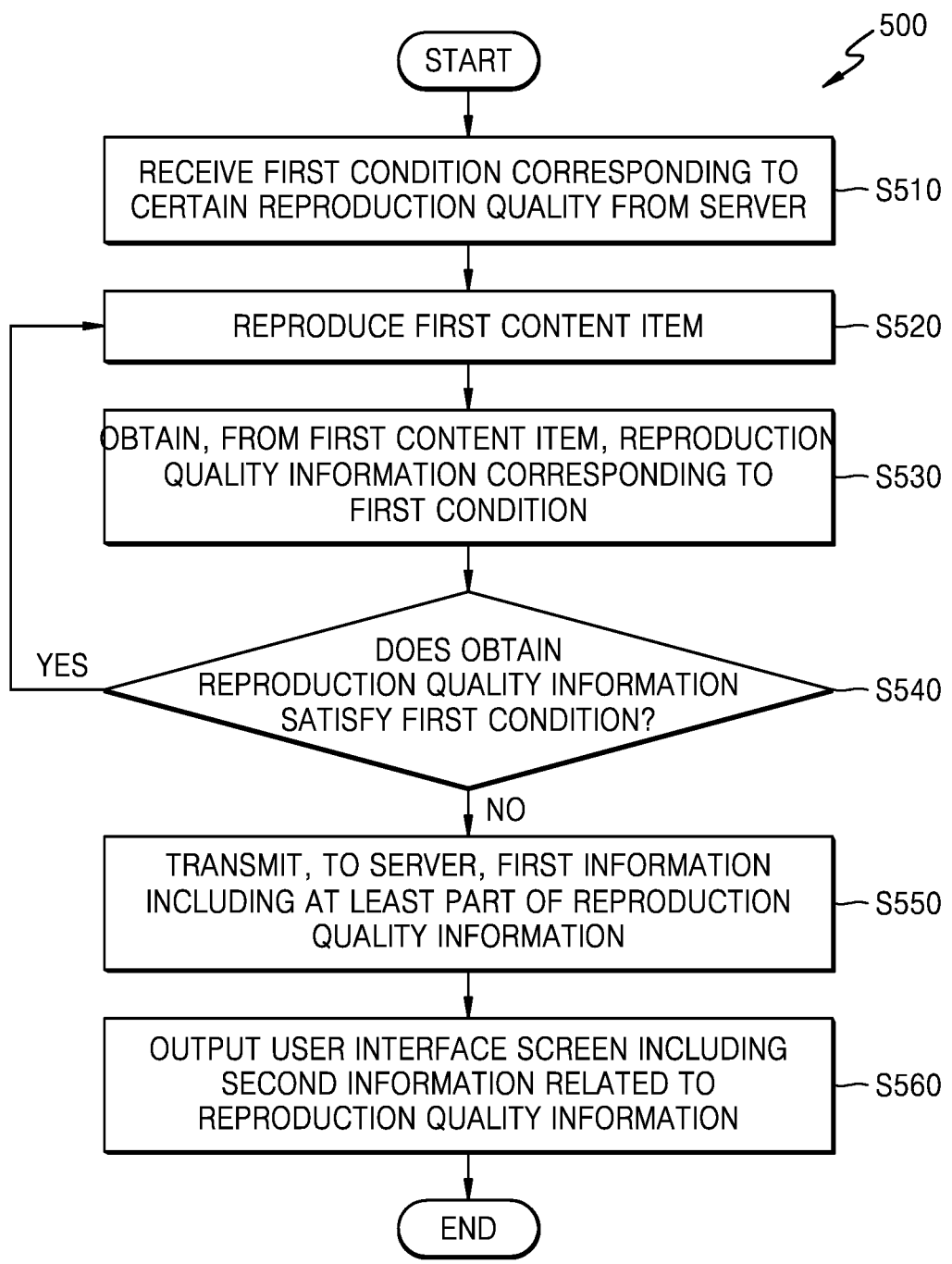
FIG. 5 is a flowchart for explaining operations performed in a display device, according to an embodiment of the present disclosure.

FIG. 5 is a flowchart for explaining operations performed in a display device according to an embodiment of the present disclosure. The flowchart illustrated in FIG. 5 is a flowchart illustrating operations 500 of the display device according to an embodiment of the present disclosure, for describing the operations 400 of the display device in more detail. The operations 500 of the display device according to an embodiment of the present disclosure may be performed by the display device 200 according to an embodiment of the present disclosure described with reference to FIG. 2. In addition, operations S510, S530, S550, and S560 included in the operations 500 of the display device may correspond to operations S410, S420, S430, and S440 of the operations 400 of the display device, respectively.

Therefore, in describing the operations 500 of the display device, description that had been provided in connection with FIGS. 1 to 4 will be omitted.

Referring to FIG. 5, the controller 240 of the display device 200 may determine whether the obtained reproduction quality information of the first content item satisfies the first condition received from the server (S540). As a result of the determination by the controller 240, if the reproduction quality information satisfies the first condition received from the server, the reproduction of the content item may be controlled to be resumed (S520). After the reproduction of the first content item is resumed, the reproduction quality information corresponding to the certain reproduction quality is obtained again whenever an event occurs (S530).

That is, during the reproduction of the content item, if a certain event does not occur, operations S520 to S540 are repeatedly performed, and operations S550 and S560 are not performed.

Meanwhile, in operation S540, depending on whether the reproduction quality information obtained from the first content item being reproduced satisfies the received first condition, a value may be set to 1 if the reproduction quality information does not satisfy the received first condition, and 0 if the reproduction quality information satisfies the received first condition. Accordingly, if the value is 1, the controller 240 may determine that there is an error in the reproduction quality information of the first content item being reproduced, and may transmit, to the server, the first information related to the reproduction quality information obtained from the first content item. That is, if the obtained reproduction quality information does not satisfy the received first condition, the first information including at least part of the reproduction quality information may be transmitted to the server (S550). In addition, the controller 240 may control the user interface screen including the second information related to the reproduction quality information of the content item, to be output (S560).

For example, if the first condition received from the server is 'a total accumulated delay due to buffering is equal to or less than 10 minutes', the second information may include the reproduction quality information confirmation request method. As a result of determining, by the controller 240, the reproduction quality information based on the reproduction quality information stored in the memory 230, if the total accumulated delay due to buffering exceeds 10 minutes, that is, the first condition is not satisfied, the value may be changed to 1, and the first information including at least part of the reproduction quality information of the content item may be controlled to be transmitted to the server. On the other hand, if the total accumulated delay due to buffering does not exceed 10 minutes, that is, the first condition is still satisfied, the value is maintained as 0, and the first information related to the content reproduction quality information may be controlled not to be transmitted to the server.

In addition, it is obvious that if the reproduction quality information of the first content item does not satisfy the first condition during the reproduction of the first content item, the controller 240 may control a key menu for requesting confirmation of the reproduction quality information output on the user interface screen, to be output, and may provide, if a user input is received, information on refundability or a problem solving method, and the information to be provided may be changed according to a policy of the content provider, without being limited thereto.

Figure 6:
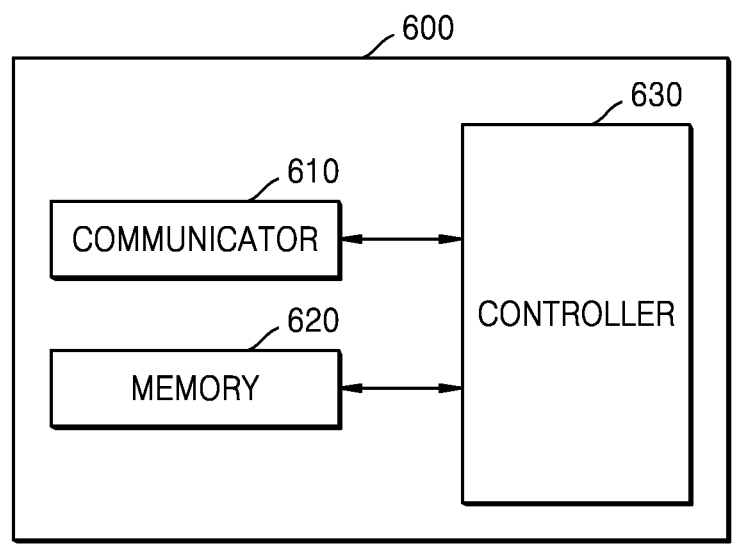
FIG. 6 is a block diagram illustrating a server according to an embodiment of the present disclosure.

FIG. 6 is a block diagram illustrating a server according to an embodiment of the present disclosure. The server 600 may equally correspond to the server 120 described with reference to FIG. 1.

Referring to FIG. 6, the server 600 according to an embodiment of the present disclosure may include the communicator 610 to communicate with the external server (not shown), the memory 620, and the controller 630 including at least one processor (not shown) to execute at least one instruction.

According to an embodiment of the present disclosure, the server 600 may include: a communicator 610 to communicate with a display device; a memory 620 storing at least one instruction; and a controller 630 including at least one processor to execute at least one of the at least one instruction, wherein the processor provides the display device with a first content item through the communicator 610, transmits a first condition related to a certain reproduction quality of the first content item, receives first information related to reproduction quality information of the first content item from the display device, and transmits second information related to the reproduction quality information of the first content item to the display device, and wherein the first information is received if the reproduction quality information of the first content item obtained when the display device reproduces the first content item, satisfies the transmitted first condition.

In describing the first content item, the first condition, the first information, and the second information illustrated in FIG. 6, description that had been provided in connection with FIGS. 1 and 5 will be omitted.

The communicator 610 may communicate with an external device (not shown) to provide at least one content item through a certain channel. Specifically, the communicator 610 may transmit at least one of a plurality of content items corresponding to a plurality of channels. Here, the channel may be a broadcast channel. In addition to the broadcast channel, the channel may refer, for example, to a content transmission path corresponding to a content provider that transmits certain content. For example, the channel may refer, for example, to a transmission path through which a video on demand (VoD) service and/or a streaming content providing service are/is transmitted in addition to the broadcast channel, and may be represented in the form of a certain number, a certain character, or a combination of the certain character and the certain number like the broadcast channel. For example, a certain streaming movie providing service may be received through channel '20', and a user of the display device 200 may view movie content provided by the certain streaming movie providing service when selecting channel '20'.

The communicator 610 may communicate with external devices (not shown) through a wired or wireless network. Here, the external device (not shown) is a device capable of outputting a certain content item through a certain channel, and may by any device including a communicator and a display.

The communicator 610 may provide the first content item to the display device, transmit the first condition related to the certain reproduction quality of the first content item being provided, receive the first information related to the reproduction quality of the first content item from the display device, and transmit the second information related to the received reproduction quality information to the display device.

The communicator 610 according to an embodiment of the present disclosure may include at least one communication module such as a short-range communication module, a wired communication module, a mobile communication module, a broadcast receiving module, etc. Here, the at least one communication module may refer to a communication module capable of transmitting and receiving data through a network conforming to communication standards such as a tuner performing broadcast receiving, Bluetooth, wireless LAN (WLAN, Wi-Fi), wireless broadband (Wibro), worldwide interoperability for microwave access (Wimax), CDMA, or WCDMA.

The memory 620 may store one or more instructions.

The memory 620 may store a condition corresponding to the certain reproduction quality set for each content item under the control of the controller 630. Meanwhile, when the predefined reproduction quality required for each content item and the corresponding condition are changed under the control of the controller 630, the changed condition may be updated and stored in the memory 620. It is obvious that the memory 620 may store a basic condition (default) that is automatically set if the condition is not defined for a certain content item.

The first condition may be stored in the memory 620.

Specifically, the processor (not shown) may set a condition (specifically, the first condition) corresponding to a certain reproduction quality of a content item stored in the memory 620, to be a condition for determining the reproduction quality related to at least one of information on an error occurring in reproducing the content item and information related to a delay occurring in buffering the content item.

The memory 620 may store the first condition required for the first content item and the second information corresponding to the first condition. For example, the second information corresponding to the first condition may include at least one of the confirmation request method for confirming the reproduction quality information of the content item, the refund criteria for receiving a refund for a payment made to view the content item, or the refund request method for receiving the refund for the payment made to view the content item.

When the second information corresponding to the reproduction quality information of the first content item is changed under the control of the controller 630, the controller 630 may update the changed information and store the updated information in the memory 620.

As the condition corresponding to the certain reproduction quality for each content item is stored in the memory 620, the display device (not shown) may determine the reproduction quality information of the first content item based on the first condition if the user reproduces the first content item, and may determine the reproduction quality information of the second content item based on the second condition if the user reproduces the second content item. That is, each display device may receive a specific condition for each content item being reproduced, and accordingly, the user may be provided with information on specific refund criteria corresponding to various reproduction qualities for each content item.

The memory 620 may receive and store the first information including at least part of the reproduction quality information from the display device (not shown) through the communicator 610. For example, if the first condition is 'the number of buffering events is 10 or less', and the number of buffering events of the first content item being reproduced exceeds 10, the first information (e.g., a base bit rate, changed bit rates, points of changes, etc.) for determining the number of buffering events may be received from the display device.

By storing the first information received from the display device in the memory 620, the controller 630 may manage and/or change the first condition or the second information based on the stored first information. In addition, the determination of whether the reproduction quality information of the first content item satisfies the first condition is performed by the display device, the first information is controlled to be transmitted only if the reproduction quality information of the first content item satisfies the first condition, and thus unnecessary data transmission to the server may be prevented.

The memory 620 may include at least one of flash memory, a hard disk, a multimedia card micro, card-type memory (e.g., SD or XD memory), random access memory (RAM), static random access memory (SRAM), read-only memory (ROM), electrically erasable programmable read-only memory (EEPROM), programmable read-only memory (PROM), magnetic memory, a magnetic disc, or an optical disc.

The controller 630 may include at least one processor (not shown) to execute at least one instruction. Each of the at least one processor may perform a certain operation by executing at least one of the one or more instructions stored in the memory 620.

Each of the at least one processor (not shown) may also perform a certain operation by executing at least one of the one or more instructions stored in the controller 630.

In addition, the at least one processor included in the controller 630 may control operations performed in the server 600, and may control other elements included in the server 600 to perform a certain operation. Therefore, although it is described below that the controller 630 controls certain operations to be performed, it will be easily understood that the at least one processor included in the controller 630 may control the certain operations to be performed.

In addition, the controller 630 may include an internal memory (not shown) and at least one processor (not shown) to execute at least one stored program. Specifically, the internal memory (not shown) of the controller 630 may store one or more instructions. The at least one processor (not shown) included in the controller 630 may execute at least one of one or more instructions stored in an internal memory (not shown) of the controller 630 to perform a certain operation.

Specifically, the controller 630 may include RAM (not shown) storing signals or data input from outside the server 600 or used as a storage area for various operations performed by the server 600, ROM (not shown) storing a plurality of instructions and/or a control program for controlling the server 600, and at least one processor (not shown). The processor (not shown) may include a graphic processing unit (not shown) for processing graphics corresponding to video data. The processor (not shown) may be implemented as a system on chip (SoC) in which a core (not shown) is integrated with a GPU (not shown). The processor (not shown) may include a single core, dual cores, triple cores, quad cores, or cores corresponding to a multiple thereof.

Hereinafter, for convenience of explanation, an example in which, when the controller 630 performs or controls a certain operation, the processor (not shown) of the controller 630 performs the certain operation by executing at least one instruction stored in the memory 620 will be described.

The controller 630 may control the condition and/or information corresponding to the certain reproduction quality for each content item, to be set or changed. Here, because the conditions required for content items may be different from each other, the controller 630 may control the condition required for each content item defined by a service provider and the corresponding information, to be stored in the memory 620 If a certain condition is not set for the content item, the controller 630 may control the condition to be automatically defined to be the basic condition and information pre-stored in the memory 620, and in this case, specific conditions and information may be defined for specific content items. For example, if the first condition and the second information are not specifically defined for the first content item, the controller 630 may control the 'refund request method (the second information)' to be provided if a condition that 'an accumulated buffering time is 10 minutes or less' is not satisfied, and in a case of a special content item such as a three-dimensional content item, that is, its condition and information may be different from those of a general content item, the controller 630 may output a user interface screen for receiving the condition and information corresponding to the special content item.

In addition, the controller 630 may control a user interface screen for setting or changing the first condition and/or the second information of the first content item, to be output. It is obvious that the controller 630 may include a display (not shown) that enables the content provider to set the first condition and the second information. Accordingly, the changed first condition or second information may be applied to the first content item provided after the first condition or the second information is changed.

Accordingly, the content provider may set and/or change the first condition and/or the second information under the control of the controller 630, and thus may provide the refund criteria for determining the quality of the content item being provided to the user. In addition, because the first condition or the second condition may be dynamically changed based on the received first information, the controller 630 may easily reflect the user's demands for the certain reproduction quality, respond to a malicious refund request of a user, and easily correct a hole in a content providing policy.

According to an embodiment of the present disclosure, when the user input corresponding to the second information is received from the display device, the controller 630 may control the reproduction quality information of the content item to be provided if the second information is the quality information confirmation request method, and may provide at least one of notification information on refundability, the refund request method, or the problem solving method, or provide other information according to a policy of the service provider.

According to another embodiment of the present disclosure, when the user input corresponding to the second information is received from the display device, the controller 630 may receive a refund request through the communicator 610 if the second information is the refund request method, and may control refunding of the payment made to view the first content item, to be performed.

In a case where a request for viewing the first content item is received from the display device (not shown) before the first content item is provided to the display device (not shown) through the communicator 610, the processor (not shown) may transmit, to the display device, information on refundability according to the certain reproduction quality of the first content item, before the payment is made to view the first content item.

Accordingly, the user may confirm the refund criteria in advance and determine whether to view the first content item, before making the payment to view the first content item.

Hereinafter, screens including the second information according to an embodiment of the present disclosure will be described with reference to FIGS. 7 to 11.

Figure 7:
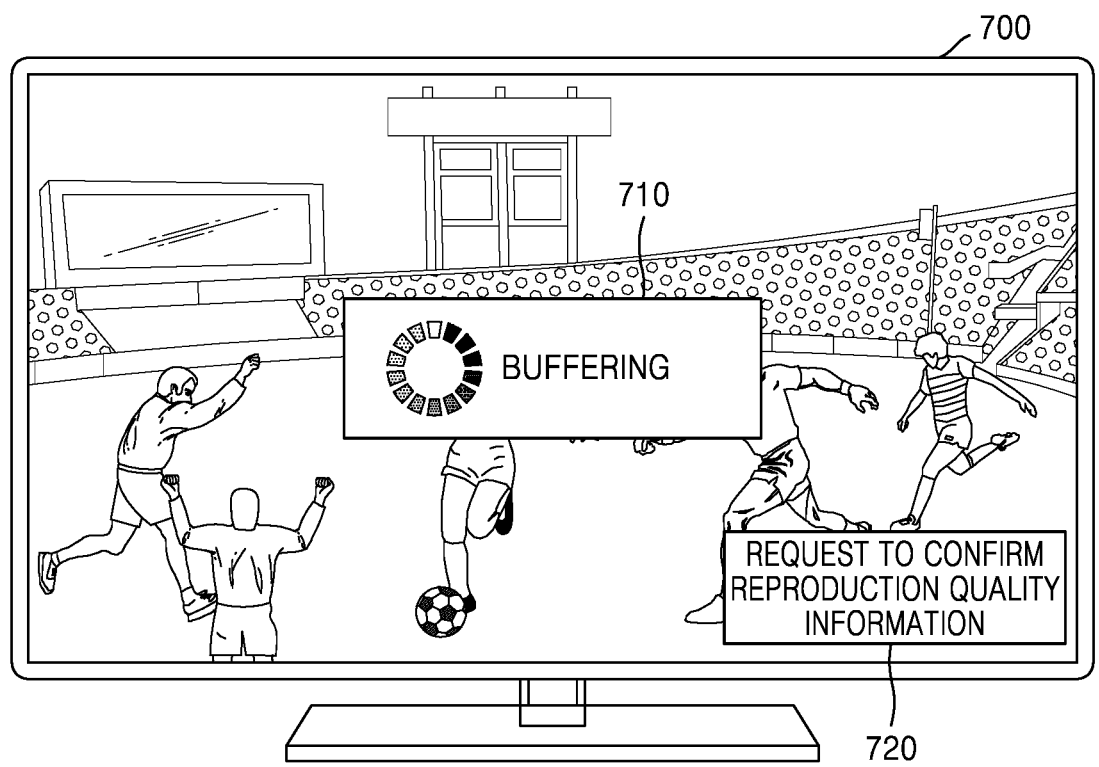
FIG. 7 is a diagram illustrating an example of a screen including a method of requesting confirmation of reproduction quality information, according to an embodiment of the present disclosure.

FIG. 7 is a diagram illustrating an example of a screen including a method of requesting confirmation of reproduction quality information according to an embodiment of the present disclosure.

Referring to FIG. 7, the controller 240 may control the display 210 to output a screen 700 including a key menu 720 including the second information.

The second information may include the reproduction quality information confirmation request method.

Referring to FIG. 7, if a certain event 710 occurs during the reproduction of the first content item, the controller 240 may determine whether the reproduction quality information of the first content item being reproduced satisfies the first condition received from the server 600, and if the reproduction quality information does not satisfy the first condition, the controller 240 may control the screen 700 including the second information 720 to be output.

When a user input corresponding to the key menu 720 including the second information is received from the user, the controller 240 may control a user interface screen including the refund request method for the payment made to view the first content item or notification information on refundability.

The reason why the controller 240 outputs the user interface screen including the key menu 720 including the second information is to selectively provide the user with the reproduction quality information confirmation request method because the reproduction of the first content item needs to be resumed if the user does not want to request a refund even though the certain event 710 has occurred. The first condition for outputting the user interface screen including the key menu 720 including the second information may be changed by the policy of the content provider as described above.

In FIG. 7, the certain event 710 may be related to other certain reproduction qualities such as a resolution of the content item, a synchronization error, or the like, as well as buffering.

Figure 8:
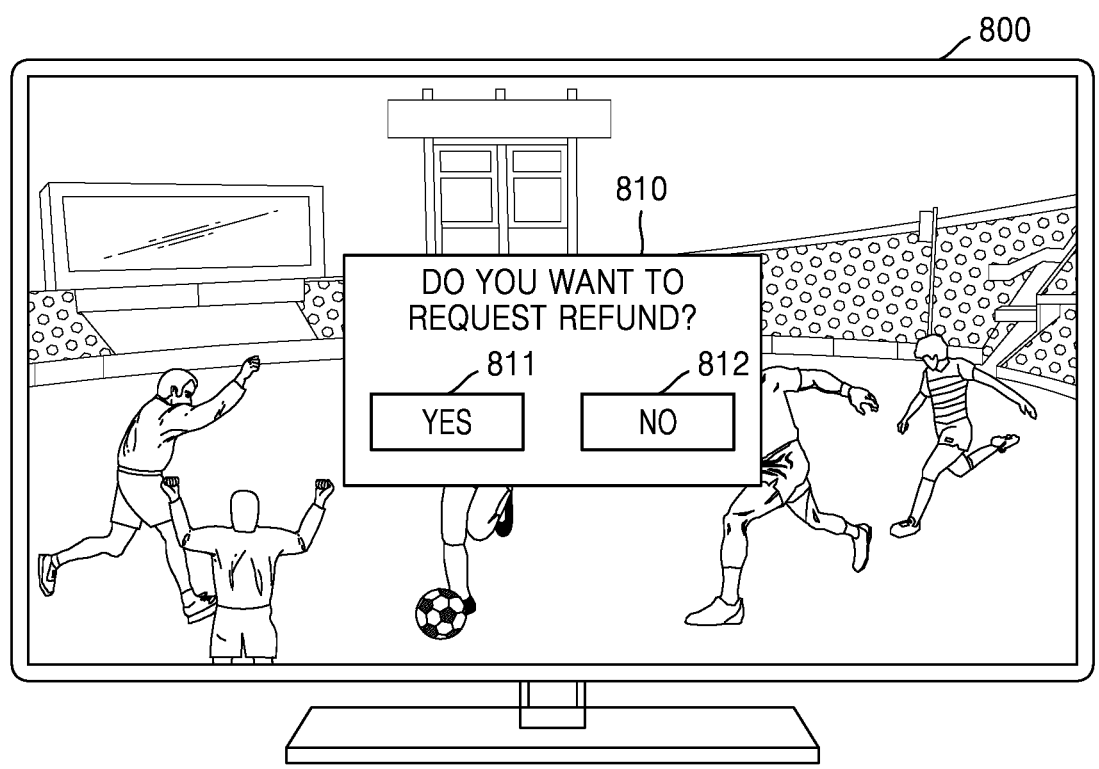
FIG. 8 is a diagram illustrating an example of a screen including a refund request method, according to an embodiment of the present disclosure.

FIG. 8 is a diagram illustrating an example of a screen including a refund request method according to an embodiment of the present disclosure.

Referring to FIG. 8, the controller 240 may control the display 210 to output a screen 800 including a pop-up window 810 including the second information.

The second information may include the refund request method.

Referring to FIG. 8, if the certain event occurs during the reproduction of the first content item, the controller 240 may determine whether the reproduction quality information of the first content item being reproduced satisfies the first condition received from the server 600, and if the reproduction quality information does not satisfy the first condition, the controller 240 may control the screen 800 including the pop-up window 810 including the second information, to be output.

For example, if an obvious event that the user is eligible to request a refund occurs, such as when an accumulated actual reproduction time is zero even after a predefined time from the beginning of the reproduction of the first content item, the controller 240 may control the screen 800 including the pop-up window 810 including the second information, rather than the reproduction quality information confirmation request method, to be output.

In addition, the controller 240 may control the screen 800 including the pop-up window 810 including the second information to be output even if a refund is requested from the user in relation to the reproduction quality information confirmation request of the user.

For example, if an input for selecting the key menu 720 including the second information is received from the user on the screen 700 including the key menu 720 including the second information, the controller 240 may control the screen 800 including the pop-up window 810 including the second information to be output.

It is obvious that the first condition for outputting the user interface screen including the pop-up window 810 including the second information may be changed by the policy of the content provider as described above.

If a key menu 811 for requesting a refund is input from the user, the controller 240 may transmit the refund request to the server 600. On the other hand, if a key menu 812 for refusing to request a refund is input from the user, the controller 240 may control the reproduction of the first content item to be resumed.

Figure 9:
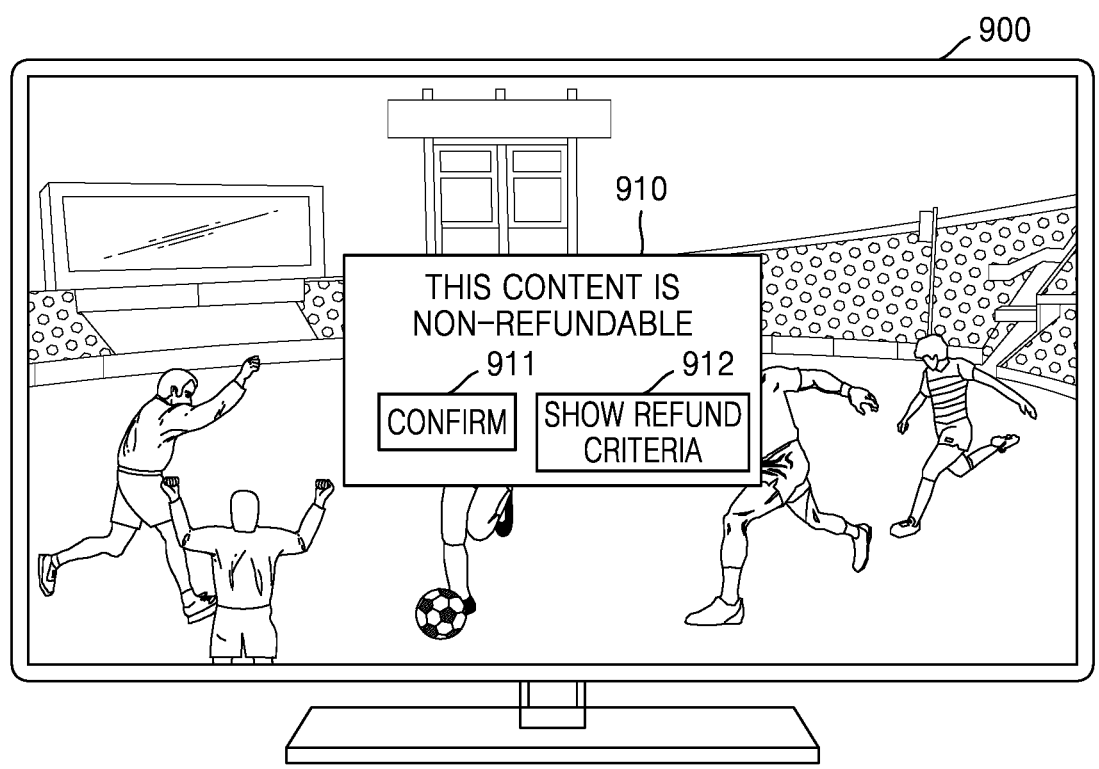
FIG. 9 is a diagram illustrating a screen including notification information on refundability, according to an embodiment of the present disclosure.

FIG. 9 is a diagram illustrating a screen including notification information on refundability according to an embodiment of the present disclosure.

Referring to FIG. 9, the controller 240 may control the display 210 to output a screen 900 including a pop-up window 910 including the second information.

The second information may include the refund criteria for receiving the refund for the payment made to view the first content item.

Referring to FIG. 9, if the certain event occurs during the reproduction of the first content item, the controller 240 may determine whether the reproduction quality information of the first content item being reproduced satisfies the first condition received from the server 600, and when the reproduction quality information does not satisfy the first condition, the controller 240 may control the screen 900 including the pop-up window 910 including the second information, to be output.

The controller 240 may control the screen 900 including the pop-up window 910 including the second information rather than the reproduction quality information confirmation request method, to be output. The first condition for outputting the user interface screen including the pop-up window 910 including the second information may be changed by the policy of the content provider as described above.

In addition, if a confirm key menu 911 is input from the user, the controller 240 may control the reproduction of the first content item on a previously displayed screen, and if a key menu 912 including the refund criterion information is input, the controller 240 may control the first condition and the second information received from the server, to be output.

Figure 10:
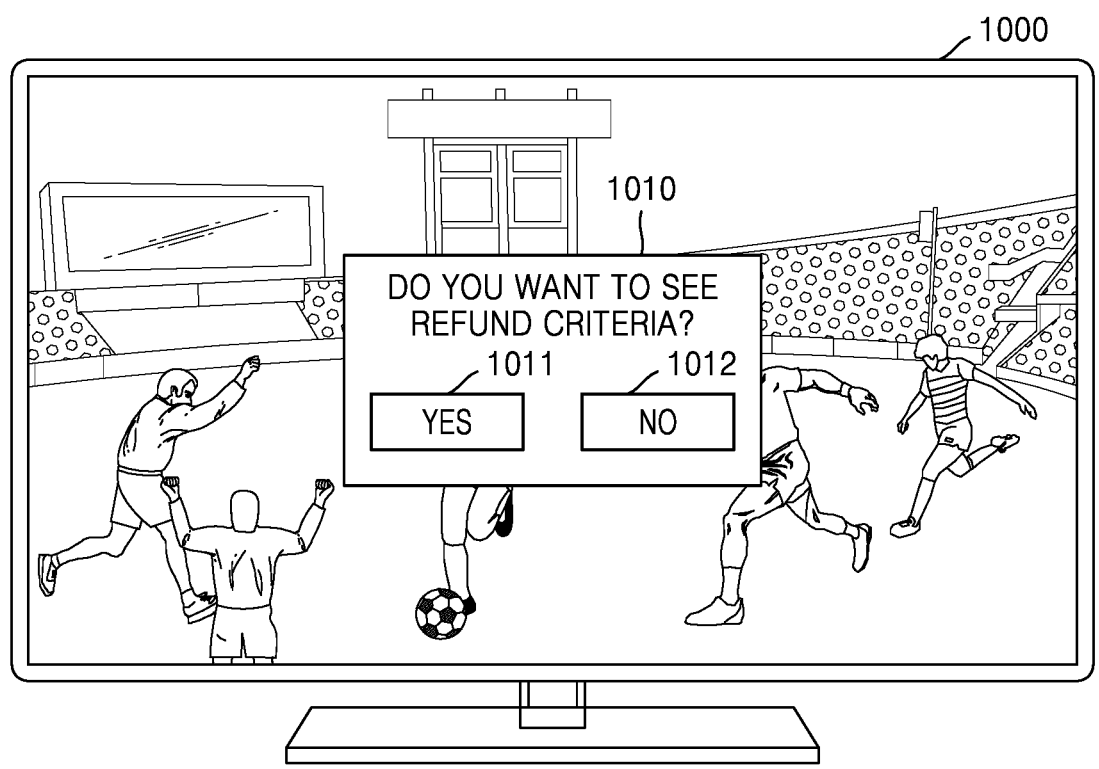
FIG. 10 is a diagram illustrating a screen including notification information on refund criteria when purchasing a content item, according to an embodiment of the present disclosure.

FIG. 10 is a diagram illustrating a screen including notification information on refund criteria when purchasing a content item according to an embodiment of the present disclosure.

Referring to FIG. 10, the controller 240 may control the display 210 to output a screen 1000 including a pop-up window 1010 including the notification information on the refund criteria.

The second information may include the notification information on the refund criteria.

Referring to FIG. 10, if the user input for viewing the first content item is received, the controller 180 may control the screen 1000 including the pop-up window 1010 including the information on the refund criteria according to the certain reproduction quality of the first content item, to be output before the payment is made to view the first content item.

If a refund criterion confirmation key menu 1011 is input, the controller 240 may control an operation such as downloading, reproducing (streaming), or entry channel, to be performed on the first content item, and if a key menu 1012 for refusing to confirm the refund criteria is input, the controller 240 may control the screen to return to the previously displayed screen by considering that the user does not agree with the refund criteria.

Figure 11:
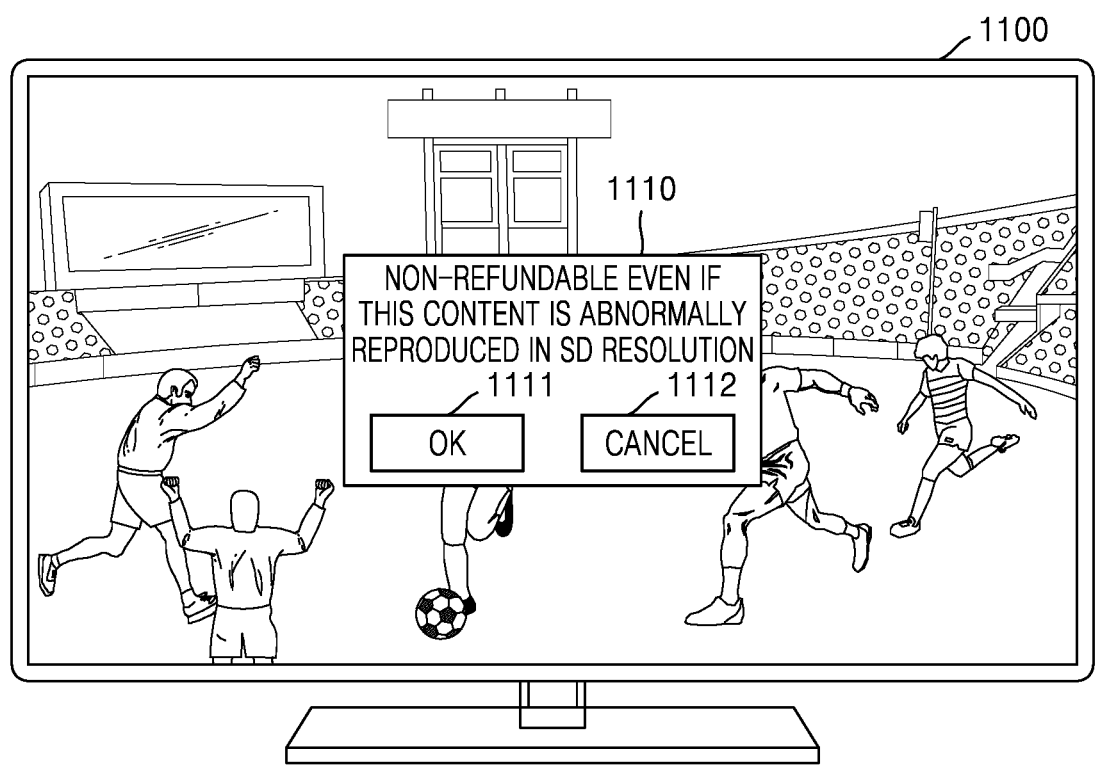
FIG. 11 is a diagram illustrating another screen including notification information on refund criteria when purchasing a content item, according to an embodiment of the present disclosure.

FIG. 11 is a diagram illustrating another screen including notification information on refund criteria when purchasing a content item according to an embodiment of the present disclosure.

Referring to FIG. 11, the controller 240 may control the display 210 to output a screen 1100 including a pop-up window 1110 including detailed notification information on the refund criteria.

The second information may include the notification information on the refund criteria. Specifically, in FIG. 11, the pop-up window 1110 including the notification information on the refund criteria indicates the notification information including the refund criterion that 'This content item is non-refundable even though it is reproduced in an SD resolution'.

Referring to FIG. 11, if the user input for viewing the first content item is received, the screen 1100 including the pop-up window 1110 including the notification information on the refund criteria according to the certain reproduction quality of the first content item may be controlled to be output before the payment is made to view the first content item.

If a refund criterion confirmation key menu 1111 is input, the controller 240 may control an operation such as downloading, reproducing (streaming), or entry channel, to be performed on the first content item, and if a key menu 1112 for refusing to confirm the refund criteria is input, the controller 240 may control the screen to return to the previously displayed screen by considering that the user does not agree with the refund criteria.

The display device and the server for controlling refunding based on the reproduction quality information of the content item according to an embodiment of the present disclosure may be implemented in the form of program commands that may be executed through various computer means and may be recorded in a computer-readable medium. In addition, the embodiments of the present disclosure may be formed as a computer-readable recording medium in which one or more programs including instructions for executing the method for operating of the display device are recorded.

The computer-readable recording medium may include program commands, data files, data structures, or combinations thereof. The program commands recorded on the computer-readable recording medium may be those specially designed and constructed for the purposes of the present disclosure, or they may be of the kind well known and available to those of ordinary skill in the art of computer software. Examples of the computer-readable recording medium include magnetic media (e.g., hard disks, floppy disks, and magnetic tapes), optical media (e.g., CD-ROMs or DVDs), magneto-optical media (e.g., floptical disks), and hardware devices (e.g., ROMs, RAMs, or flash memories, etc.) that are specially configured to store and execute program commands. Examples of the program commands include both machine code, such as code made by a compiler, and high-level language code that may be executable by an interpreter.

While various example embodiments of the present disclosure have been described in detail, various changes in form and details may be made therein without departing from the scope of the present disclosure including the following claims.

The invention claimed is:

1. A display device comprising:
    a display;
    a communicator to communicate with a server;
    a memory storing at least one instruction; and
    a controller comprising at least one processor to execute the at least one instruction,
    wherein the processor is configured to:
    receive a first condition corresponding to a certain reproduction quality from the server through the communicator,
    obtain reproduction quality information corresponding to the first condition upon reproduction of a first content item,
    determine whether the reproduction quality information satisfies the first condition,
    in case that the reproduction quality information does not satisfy the first condition, transmit, to the server, first information indicating that the reproduction quality information does not satisfy the first condition, and
    control the display to output a user interface screen comprising second information related to the reproduction quality information,
    wherein the reproduction quality information is accumulated and stored in the memory, even if the reproduction of the first content item is stopped before completion and then is resumed,
    wherein the first condition comprises at least one of the reproduction quality information to be above a certain resolution, and
    wherein the first information is not transmitted to the server, in case that the reproduction quality information satisfies the first condition.

2. The display device of claim 1, wherein the first information further comprises at least one of information about an error occurring in reproducing the first content item, and information related to a delay occurring in buffering the first content item.

3. The display device of claim 1, wherein the second information comprises information indicating a confirmation request method for confirming the reproduction quality information, and
    the processor is further configured to execute the at least one instruction to:
    control the display to output a user interface screen comprising a refund request method for receiving a refund for a payment made to view the first content item, or comprising notification information regarding whether the first content item is refundable, if the reproduction quality information does not satisfy the first condition and a user input corresponding to a request for reproduction quality information confirmation is received through the user interface screen.

4. The display device of claim 1, wherein the second information comprises information indicating a refund request method for receiving a refund of a payment made to view the first content item, and
    the processor is further configured to execute the at least one instruction to control a refund request to be transmitted to the server, if the reproduction quality information does not satisfy the first condition and a user input corresponding to the refund request is received through the user interface screen.

5. The display device of claim 1, wherein the second information comprises at least one of a confirmation request method for confirming the reproduction quality information, refund criteria for receiving a refund of a payment made to view the first content item, or a refund request method for receiving the refund of the payment made to view the first content item.

6. The display device of claim 1, wherein the processor is further configured to execute the at least one instruction to control the display to output a user interface screen comprising information about refund criteria according to the certain reproduction quality of the first content item, before a payment is made to view the first content item, if a user input for viewing the first content item is received.

7. A server comprising:
    a communicator to communicate with a display device;
    a memory storing at least one instruction; and
    a controller comprising at least one processor to execute the at least one instruction,
    wherein the processor is configured to:
    provide the display device with a first content item through the communicator,
    transmit a first condition related to a certain reproduction quality of the first content item,
    receive first information indicating that reproduction quality information does not satisfy the first condition from the display device, in case that the reproduction quality information does not satisfy the first condition, and
    transmit second information related to the reproduction quality information of the first content item to the display device, in case that the reproduction quality information does not satisfy the first condition,
    wherein whether the reproduction quality information satisfies the first condition is determined by the display device, and
    wherein the reproduction quality information is accumulated and stored in the memory of the display device, even if a reproduction of the first content item is stopped before completion and then is resumed,
    wherein the first condition comprises at least one of the reproduction quality information to be above a certain resolution, and
    wherein the first information is not transmitted from the display device, in case that the reproduction quality information satisfies the first condition.

8. The server of claim 7, wherein the processor is further configured to execute the at least one instruction to control a user interface for setting or changing the first condition based on the first information, to be output.

9. The server of claim 7, wherein the second information comprises at least one of a confirmation request method for confirming the reproduction quality information, refund criteria for receiving a refund of a payment made to view the first content item, or a refund request method for receiving the refund of the payment made to view the first content item.

10. The server of claim 7, wherein the processor is further configured to execute the at least one instruction to control a user interface for setting or changing the second information to be output.

11. The server of claim 7, wherein the processor is further configured to execute the at least one instruction to control refunding of costs corresponding to viewing of the first content item, to be performed, if the second information is a refund request method, and a user input for a refund request is received from the display device.

* * * * *